United States Patent

Stark et al.

(10) Patent No.: US 6,221,934 B1
(45) Date of Patent: Apr. 24, 2001

(54) AQUEOUS DISPERSIONS OF EPOXY RESINS

(75) Inventors: Charles J. Stark, deceased, late of Houston, by Ann Elizabeth Stark, administrator; Jimmy D. Elmore, Houston; Gayle Edward Back, Houston; Pen-Chung Wang, Houston; Ernest Charles Galgoci, Jr., Sugar Land, all of TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/116,923

(22) Filed: Jul. 17, 1998

Related U.S. Application Data

(63) Continuation-in-part of application No. 08/911,480, filed on Aug. 14, 1997, now abandoned.

(51) Int. Cl.[7] .................................................. C08K 3/20
(52) U.S. Cl. ......................... 523/404; 525/423; 523/414; 523/418; 523/417; 523/420
(58) Field of Search ................................. 523/404, 414, 523/418, 420, 417; 525/423

(56) References Cited

U.S. PATENT DOCUMENTS

| | | | |
|---|---|---|---|
| 3,280,054 | 10/1966 | Gotze et al. ............................. | 260/18 |
| 3,474,056 | 10/1969 | Schneider et al. ...................... | 260/18 |
| 3,870,666 | 3/1975 | Becker ................................... | 260/21 |
| 4,122,067 | 10/1978 | Anderson ............................... | 528/89 |
| 4,315,044 | 2/1982 | Elmore et al. .......................... | 427/386 |
| 4,423,166 | * 12/1983 | Moriarity et al. ...................... | 523/414 |
| 5,017,675 | * 5/1991 | Marten et al. .......................... | 528/111 |
| 5,118,729 | 6/1992 | Piechocki .............................. | 523/404 |
| 5,166,423 | 11/1992 | Fried ..................................... | 562/537 |
| 5,236,974 | 8/1993 | Dreischhoff et al. ................. | 523/403 |
| 5,250,727 | 10/1993 | Fried ..................................... | 562/540 |
| 5,319,004 | 6/1994 | Marten et al. .......................... | 523/404 |
| 5,356,961 | 10/1994 | Nishimura et al. .................... | 523/414 |
| 5,478,872 | 12/1995 | Yamasoe et al. ....................... | 524/45 |
| 5,494,705 | 2/1996 | Yamasoe et al. ....................... | 427/327 |
| 5,596,030 | * 1/1997 | Walker .................................. | 523/404 |
| 5,602,193 | 2/1997 | Stark ..................................... | 523/403 |
| 5,643,976 | * 7/1997 | Arora et al. ............................ | 523/404 |
| 5,741,835 | 4/1998 | Stark ..................................... | 523/403 |
| 5,750,595 | * 5/1998 | Arora et al. ............................ | 523/404 |
| 5,786,429 | 7/1998 | Allen ..................................... | 525/430 |
| 5,874,490 | * 2/1999 | Arora et al. ............................ | 523/414 |

FOREIGN PATENT DOCUMENTS

| | | | |
|---|---|---|---|
| 2332177 | 2/1974 | (DE) .............................. | C08G/30/14 |
| 0000605 A1 | 7/1978 | (EP) .............................. | C08G/59/18 |
| 6-287276 | 10/1994 | (JP) .............................. | C08G/59/50 |
| WO 96/20978 | 7/1996 | (WO) ............................ | C08L/63/00 |

* cited by examiner

Primary Examiner—Margaret G. Moore

(57) ABSTRACT

Stable aqueous emulsions of epoxy resins are provided using an epoxy-functional surfactant prepared by reacting an amidoamine having the formula:

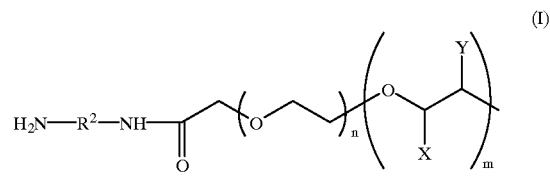

(I)

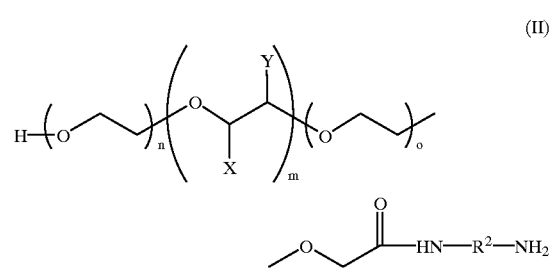

(II)

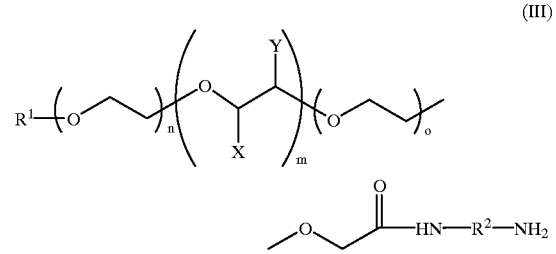

(III)

wherein $R^1$ is an alkyl, aryl, or arylalkyl group or mixtures thereof having 1 to 15 carbon atoms, $R^2$ is aliphatic, cycloaliphatic, or aromatic group having 2 to 18 carbon atoms optionally containing non-reactive oxygen or at most all average of 4 secondary and/or tertiary nitrogen atoms per structure in the backbone, X and Y are independently a hydrogen, methyl or ethyl group with the provision that if X is methyl or ethyl, Y is hydrogen or if Y is methyl or ethyl, X is hydrogen, and $n+m+o$ is a real number from 40 to 400, and $n+o$ is a real number in an amount effective to provide resin emulsification, and the ratio of (I) to (II) by weight. is in the range of 100:0 to 0:100, the ratio of (I) to (III) by weight in the range of 100:0 to 0:100, and the ratio of (II) to (III) by weight in the range of 100:0 to 0:100, and at least one epoxy resin having a functionality of from greater than 0.8 epoxide group per molecule in an amine to epoxy equivalent ratio of at least 1:2.

66 Claims, No Drawings

AQUEOUS DISPERSIONS OF EPOXY RESINS

This application is a continuation-in-part af application Ser. No. 08/911,480 filed Aug. 14, 1997, now abandoned, which content is hereby incorporated by reference.

FIELD OF INVENTION

This invention relates to aqueous dispersions oE epoxy resins. In one aspect, the invention relates to improved aqueous dispersions of epoxy resins, which provide improved coating properties and a process to prepare such dispersions.

BACKGROUND OF THE INVENTION

Aqueous dispersions of epoxy resins have been knosn for many years. However, the performance of these dispersions as elements of coatings has been viewed as inferior to their solvent borne counterparts. It is knovn that the surfactants employed to render the epoxy component emulsifiable such as nonylphenol ethoxylates, alkylphenol initiated poly(oxyethylene) ethanols, alkylphenol initiated poly(oxypropylene) poly(oxyethylene) ethanols, and block copolymers containing an internal poly(oxypropylene) block and two external poly(oxyethylene) ethanol blocks readily migrate to surface interfaces where, it is speculated, they deleteriously affect film performance.

Further as aqueous dispersions of epoxy resins have become more widely used in industry, improved handling properties such as storage stability, uniformity, small particle size, higher inversion temperature, viscosity reproducibility, and ease of transferring the dispersions become more desirable. Therefore, there is a growing need for aqueous dispersions of epoxy resins that have improved, user friendly handling properties.

SUMMARY OF THE INVENTION

According to the invention, an aqueous dispersion of an epoxy resin is provided comprising:
a) water;
b) at least one epoxy resin having a functionality of greater than 0.8 epoxide group per molecule; and
c) from 0.1 to 20 weight percent, based on the epoxy resin of at least one epoxy-functional surfactant prepared by reacting an amidoamine having the structures:

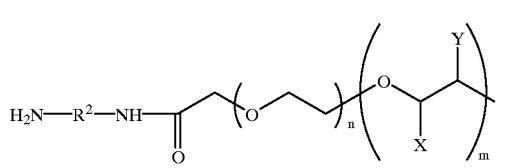

(I)

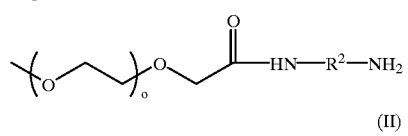

(II)

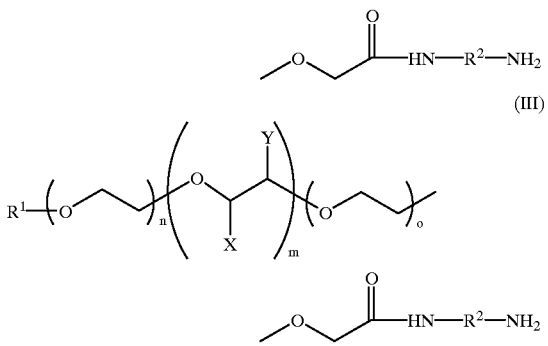

(III)

wherein $R^1$ is an alkyl, aryl, or arylalkyl group or mixtures thereof having 1 to 15 carbon atoms, $R^2$ is aliphatic, cycloaliphatic, or aromatic group having 2 to 18 carbon atoms optionally containing non-reactive oxygen or at most an average of 4 secondary and/or tertiary nitrogen atoms per structure in the backbone, X and Y are independently a hydrogen, methyl or ethyl group with the provision that if X is methyl or ethyl, Y is hydrogen or if Y is methyl or ethyl, X is hydrogen, and n+m+o is a real number from 40 to 400, and n+o is a real number in an amount effective to provide resin emulsification, and at least one epoxy resin having a functionality of from greater than 0.8 epoxide group pe:r molecule in an amine to epoxy equivalent ratio of at least 1:2, preferably from 1:6 to 1:500. The ratio of (I) to (II) by weight is in the range of 100:0 to 0:100, the ratio of (I) to (III) by weight in the range of 100:0 to 0:100, and the ratio of (II) to (III) by weight in the range of 100:0 to 0:100.

Further, curable epoxy resin compositions comprising these epoxy resin dispersions and water-compatible curing agents are provided.

DETAILED DESCRIPTION OF THE INVENTION

It has been found that by using a certain epoxy-functional surfactant an effective aqueous epoxy resin dispersion can be formed having an average particle size of generally less than 1 μ that has good shelf-life and handling properties. These dispersions are stable, retaining consistent viscosity and epoxy functionality for suitable periods of time. Further, it has been found that these dispersions can be obtained at higher inversion temperature and higher resin concentration using these surfactants resulting in shorter preparation time, greater ease of handling and higher temperature storage stability.

Epoxy-Functional Surfactant

The epoxy-functional surfactant useful in the invention can be prepared by reacting (i) at least one amidoamine having the structures:

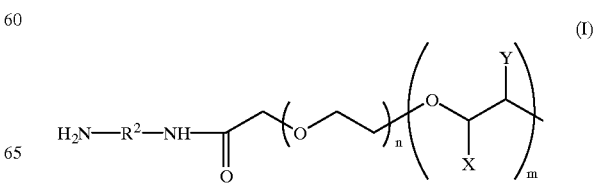

(I)

-continued

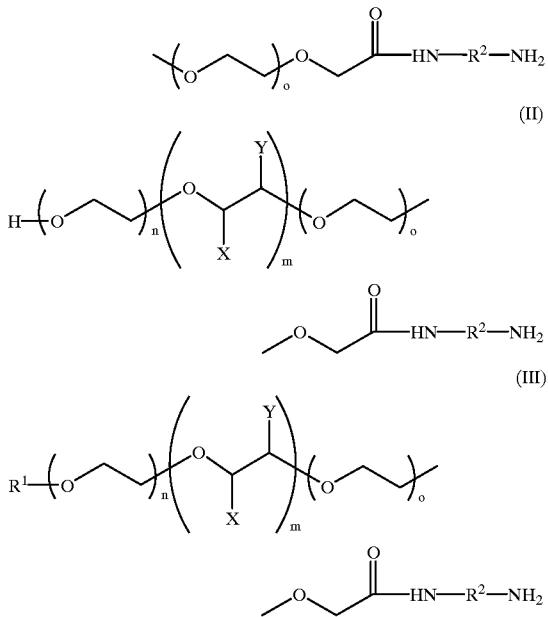

wherein $R^1$ is an alkyl, aryl, or alkylaryl group having 1 to 15 carbon atoms, preferably $C_1$–$C_4$ alkyl or nonylphenyl, most preferably methyl, $R^2$ is aliphatic, cycloaliphatic, or aromatic group having 2 to 18 carbon atoms optionally containing non-reactive oxygen or nitrogen atoms in the backbone, X and Y are independently a hydrogen, methyl or ethyl group with the provision that if X is methyl or ethyl, Y is hydrogen or if Y is methyl or ethyl, X is hydrogen and n+m+o is a real number from 40 to 400, m is a real number from 0 to 70, preferably from 0 to 50, most preferably 0, and n+o is a real number in an amount effective to provide resin emulsification which is at least 15 and in a ratio of (I) to (II) by weight in the range of 100:0 to 0:100, a ratio of (I) to (III) by weight in the range of 100:0 to 0:100, and a ratio of (II) to (III) by weight in the range of 100:0 to 0:100, and (ii) at least one epoxy resin having a functionality greater than 0.8 epoxide group per molecule. The epoxy-functional amidoamine surfactant preferably has a molecular weight within the range of from 1,700 to 40,000, preferably to 20,000. In a preferred embodiment, the ratio of n+o to m is in the range of 100:1 to 55:45.

In formula (I), preferably m is a real number from 0 to 70 and n and o are independently a real number from 5 to 395. In formula (II), preferably m is a real number from 0 to 70, n is a real number from 0 to 395, and o is a real number from 0 to 400, more preferably from 20 to 380. In formula (III), preferably m is a real number from 0 to 70, n is a real number from 0 to 395, and o is a real number from 0 to 400, more preferably from 20 to 380. In all of the above formulae (I), (II), and (III), n+o must be a real number in an amount effective to provide resin emulsificatioin which is typically at least 15, preferably at least 35. In one preferred embodiment, m is 0.

In one embodiment, the surfactant can be prepared by reacting amidoamine of structures (I) and (II) in a ratio of (I) to (II) by weight in the range of 99:1 to 1:99, preferably in the range of 20:80 to 80:20, and at least one epoxy resin. In another embodiment, the surfactant can be prepared by reacting amidoamine of structures (II) and (III) in a ratio of (II) to (III) by weight in the range of 99:1 to 1:99, preferably in the range of 20:80 to 80:20, and at least one epoxy resin.

In yet another embodiment, the surfactan.t can be prepared by reacting amidoamine of structures (I) and (III) in a ratio of (I) to (III) by weight in the range of: 99:1 to 1:99, preferably in the range of 20:80 to 80:20, and at least one epoxy resin. Further, the surfactant can be prepared by reacting amidoamine of structures (I), (II) and (III) in an amount of 4 to 98 percent by weight of (I), 1 to 95 percent by weight of (II), and 1 to 95 percent by weight of (III) with an epoxy resin.

The amidoamine is contacted with the epoxy resin under conditions effective to react the amine group and the epoxide group. Typically, the equivalent ratio of the amine to epoxy is at least 1:2, preferably in the range of from 1:6, to 1:500, more preferably in the range of from 1:6 to 1:30. The reaction is typically carried out at a temperature from ambient temperature to an elevated temperature sufficient to react the amine group and the epoxide group preferably in the range of from 50° C. to 150° C. for a time effective to produce the reaction products. The progress of the reaction can be monitored and targeted to produce the desired product by measuring the amine equivalent weight and the epoxy equivalent weight of the reactant mixture. Generally, the reaction mixture is heated until the epoxy equivalents equal to the amine equivalents added are consumed which is generally one hour or greater.

More than one epoxy resin can be reacted with the amidoamine. For example, the amidoamine can be reacted first with an monoepoxide resin and then with a diepoxy resin. In another example, the epoxy resin can be reacted with a novolac epoxy resin and a diepoxy resin stepwise or at the same time in any order.

If desired the surfactant can be recovered from the reaction mixture or made "in-situ." To provide the surfactant in-situ in the desired epoxy resin component, the amidoamine can be reacted into the desired epoxy resin component. The in-situ method is preferred providing an epoxy-functional amidoamine surfactant where the residue of the epoxy resin (hydrophobic moiety) which was reacted with the amidoamine is the same as the bulk epoxy resin that is dispersed. The residue of the epoxy resin (hydrophobic moiety) is the same as the bulk epoxy resin when the hydrophobic moiety from the surfactant has the same IR spectrum as the IR spectrum of the bulk epoxy resin. When the surfactant is recovered, the equivalent ratio of the amine to epoxy is preferably within the range of from 1:30 to 1:6.

For the in-situ method, the epoxy resin should be present in an amount sufficient to provide unreacted epoxy resin component and the surfactant adduct. Further, to provide the surfactant in-situ in an advanced epoxy resin, the amidoamine can be reacted into the mixtures of diepoxy resins such as diglycidyl ethers of dihydric phenols and dihydric phenols during advancement reaction or can be reacted into the resin after the advancement reaction. In an advancement reaction, generally the diepoxy resin and the dihydric phenol are allowed to react in a molar ratio of 7.5:1 to 1.1:1 in the presence of an advancement catalyst, producing an advanced epoxy resin having a weight per epoxy value of from 225 to 3,500. Typically, 0.1 to 15 weight percent of the amidoamine, based on epoxy resin or epoxy resin and phenolic compound, is used. It is preferred to acLd the amidoamine after the advancement reaction, whether the advanced products are separated or as is.

The preferred amidoamine is prepared by reacting an acid-terminated polyalkyleneglycol-containing compound having the formula

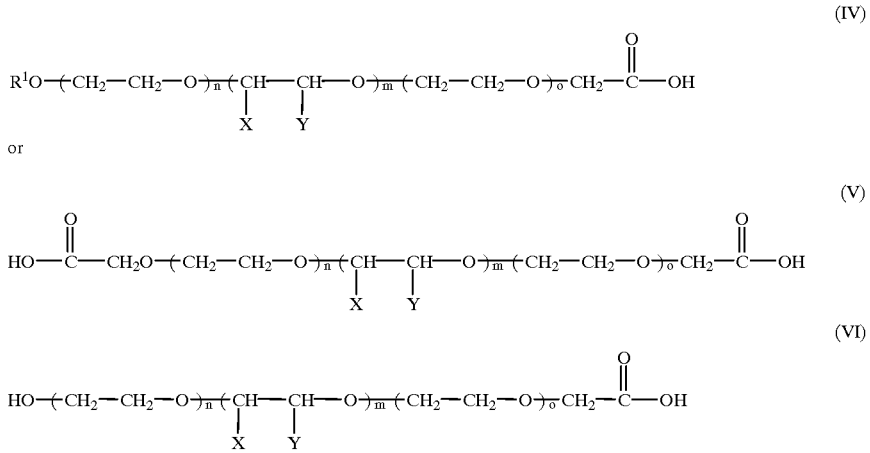

wherein $R^1$ is an alkyl, aryl, or arylalkyl group having 1 to 15 carbon atoms, n, m, and 0 are as described above, and at least one diamine in an amine to acid equivalent ratio of 6:1 to 25:1.

One embodiment of the preferred amidoamine can be prepared by reacting an acid-terminated polyalkyleneglycol methylether having the formula

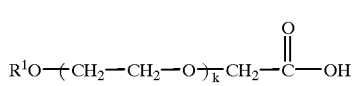 (VII)

wherein $R^1$ is as defined above, preferably methyl, and k is Et positive real number from 40 to 400, and at least one diamine in an amine to acid equivalent ratio of 6:1 to 25:1.

Preferred diamine has the formula:

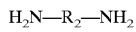 (VIII)

wherein $R^2$ is as defined above. Examples of suitable diamines include for example, m-xylylenediamine, 1,3-bisaminomethylcyclohexane, 2-methyl-1,5-pentanediamine, 1-ethyl-1,3-propanediamine, ethylenediamine, diethylenetriamine, triethylenetetramine, polyoxy-propylenediamines, 2,2(4),4-trimethyl-1,6-hexanediamine, isophorone diamine, 2,4(6)-toluenediamine, 1,6-hexanediamine, and 1,2-diaminocyclohexane.

The acid-terminated polyalkyleneglycol-containing compound can be produced by oxidation of a polyethylene glycol monoalkylether or a monoalkylether of a block copolymer of ethylene oxide and propylene oxide or butylene oxide ("polyalkylene glycol") or by at least a partial oxidation of a polyethylene glycol, or a block copolymer of ethylene oxide and propylene oxide or polybutylene oxide ("polyalkylene glycol").

Polyalkylene glycols generally contain a distribution of compounds with a varying number of oxyethylene units, n or o and/or oxypropylene or oxybutylene units, m. Generally, the quoted number of units is the whole number closest to the statistical average, and the peak of the distribution. Positive real number as used herein refers to a number which is positive and includes integers and fractions of integers.

The acid-terminated polyalkyleneglycol-containing compounds can be produced by oxidation of the polyalkylene glycols including, but not limited to, the processes described in U.S. Pat. Nos. 5,250,727 and 5,166,423. Generally, oxygen-containing gas is added to the polyalkylene glycol in the presence of a free radical (e.g., 2,2,6,6-tetramethyl-1-piperidinyloxy) and an inorganic acid (e.g., nitric acid) to produce the carboxylic acid until at least one hydroxyl group per molecule, or if diacid-terminatel polyalkyleneglycol is desired substantially all of the alcohol groups, are oxidized to carboxylic acid groups. Acid-terminated polyalkyleneglycol-containing compound can also be made by Williamson ether synthesis where a polyalkyleneglycol is reacted with chloroacetic acid and/or esters in the presence of a base.

The epoxy resins used in producing the surfactant can be any reactive epoxy resin having a 1,2-epoxy equivalency (functionality) preferably, on the average, greater than 0.8 epoxide group per molecule, in some application preferably at least 1.5, to preferably 6.5 epoxide groups per molecule. The epoxy resin can be saturated or unsaturated, linear or branched, aliphatic, cycloaliphatic, aromatic or heterocyclic, and may bear substituents which do not materially interfere with the reaction with the carboxylic acid. Such substituents can include bromine or fluorine. They may be monomeric or polymeric, liquid or solid, but are preferably liquid or a low melting solid at room temperature. Suitable epoxy resins include glycidyl ethers prepared by reacting epichlorohydrin with a compound containing at least 1.5 aromatic hydroxyl. groups carried out under alkaline reaction conditions. Examples of other epoxy resins suitable for use in the invention include monoepoxies, diglycidyl ethers of dihydric compounds, epoxy novolacs and cycloaliphatic epoxies. Generally epoxy resins contain a distribution of compounds with a varying number of repeat units. Further, the epoxy resin can be a mixture of epoxy resins. In one such embodiment, the epoxy resin can comprise a monoepoxide resin and a di- and/or a multi-functional epoxy resin, preferably an epoxy resin having a functionality of from 0.7 to 1.3 Ad and an epoxy resin having a functionality of at least 1.5, preferably-at least 1.7, more preferably from 1.8 to 2.5. The mixture can be added or reacted with the amidoamine stepwise or simultaneously.

Preferred epoxy resins include, but are not limited to, those represented by the formula:

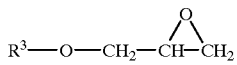

where

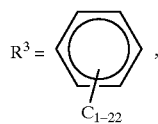

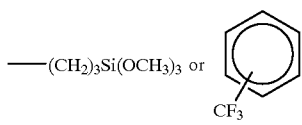

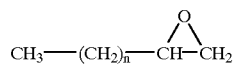

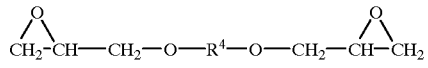

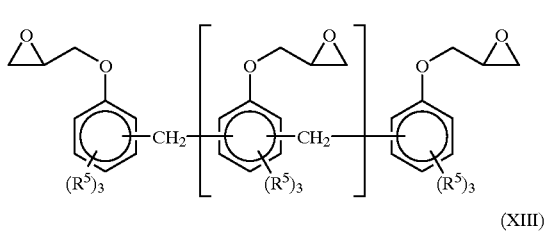

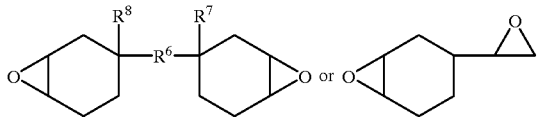

wherein r is a real number from 0 to 6, $R^3$ is a linear or branched $C_1$–$C_{22}$ alkyl group, an arylalkyl group, an alkylsilane or a halogenated aryl or alkyl group, $R^4$ is divalent aliphatic, divalent cycloaliphatic, divalent aryl, or divalent arylaliphatic group, preferably $R^4$ contains 8 to 120 carbon atoms, Rs is independently a hydrogen or a $C_1$–$C_{10}$ alkyl group, $R^6$ is a divalent aliphatic group optionally containing ether or ester group(s) or together with $R^7$ or $R^8$ form a spiro ring optionally containing heteroatoms, and $R^7$ and $R^8$ are independently hydrogen or $R^7$ or $R^8$ together with $R^6$ form a spiro ring optionally containing heteroatoms such as oxygen, preferably $R^6$ contains 1 to 20 carbon atoms. ThLea term aliphatic or cycloaliphatic includes compounds having oxygen and/or sulfur atoms on the backbone. For example, $R^4$ can be a divalent cycloaliphatic group having the formula

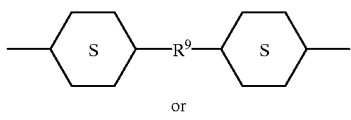

or

wherein $R^9$ and $R^{10}$ are each independently an alkylene group, or a divalent arylaliphatic group having the formula

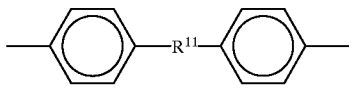

wherein $R^{11}$ is an alkylene group.

Preferably the epoxy resin is a difunctional epoxy resin such as a diglycidyl ether of a dihydric phenol, diglycidyl ether of a hydrogenated dihydric phenol, an aliphatic glycidyl ether, epoxy novolac or a cycloaliphatic epoxy.

Diglycidyl ethers of dihydric phenols can be produced, for example, by reacting an epihalohydrin with dihydric phenol in the presence of an alkali. Examples of suitable dihydric phenols include: 2,2-bis(4-hydroxyphenyl) propane (bisphenol-A); 2,2-bis(4-hydroxy-3-tert-butylphenyl) propane; 1,1-bis(4-hydroxyphenyl)ethane; 1,1-bis(4-hydroxyphenyl) isobutane; bis(2-hydroxy-1-naphthyl) methane; 1,5-dihydroxynaphthalene; 1,1-bis(4-hydroxy-3-alkylphenyl) ethane and the like. Suitable dihydric phenols can also be obtained from the reaction of phenol with aldehydes such as formaldehyde (bisphenol-F). Diglycidyl ethers of dihydric phenols includes advancement products of the above diglycidyl ethers of dihydric phenols with dihydric phenols such as bisphenol-A, such as those described in U.S. Pat. Nos. 3,477,990 and 4,734,468, which are herein incorporated by reference.

Diglycidyl ethers of hydrogenated dihydric phenols can be produced, for example, by hydrogenation of dihydric phenols followed by glycidation reaction with an epihalohydrin in the presence of a Lewis acid catalyst and subsequent formation of the glycidyl ether by reaction witla sodium hydroxide. Examples of suitable dihydric phenols are listed above.

Aliphatic glycidyl ethers can be produced, for example, by reacting an epihalohydrin with an aliphatic diol in the presence of a Lewis acid catalyst followed by conversion of the halohydrin intermediate to the glycidyl ether by reaction with sodium hydroxide. Examples of preferred aliphatic glycidyl ethers include those corresponding to the formulas:

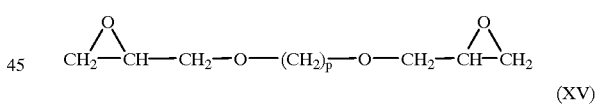

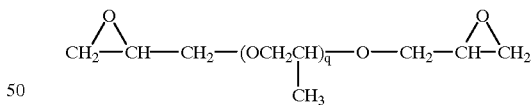

wherein:

p is an integer from 2 to 12, preferably from 2 to 6; and
q is an integer from 4 to 24, preferably from 4 to 12.

Examples of suitable aliphatic glycidyl ethers include for example, diglycidyl ethers of 1,4 butanediol, neopentyl glycol, cyclohexanedimethanol, hexanediol, polypropylene glycol, and like diols and glycols; and triglycidyl ethers of trimethylol ethane and trimethylol propane.

Examples of suitable monoepoxies include for example the glycidyl ethers or phenol, t-butyl phenol, cresol, nonyl phenol, and aliphatic alcohols. Other suitable monoepoxies include glycidated monoacids and epoxides formed from alpha olefins and glycidoxyalkylalkoxysilanes.

Epoxy novolacs can be produced by condensation of formaldehyde and a phenol followed by glycidation by reaction. of an epihalohydrin in the presence of an alkali. The phenol can be for example, phenol, cresol, nonylphenol and t-butylphenol. Examples of the preferred epoxy novolacs include those corresponding to the formula:

(XII)

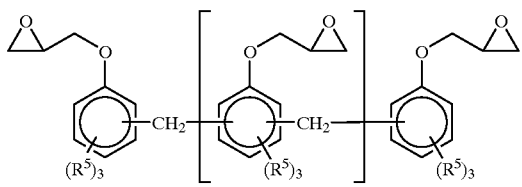

wherein $R^5$ is independently a hydrogen or a $C_1$–$C_{10}$ alkyl group and r is a real number from 0 to 6. Epoxy novolacs generally contain a distribution of compounds with a varying number of glycidated phenoxymethylene units, r. Generally, the quoted number of units is the number closest to the statistical average, and the peak of the distribution.

Cycloaliphatic epoxies can be produced by epoxidizing a cycloalkene-containing compound with greater then one olefinic bond with peracetic acid. Examples of the preferred cycloaliphatic epoxies include those corresponding to the formula:

(XIII)

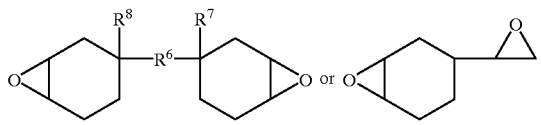

wherein $R^6$ is a divalent aliphatic group optionally containing ether or ester group(s) or together with $R^7$ or $R^8$ form a spiro ring optionally containing heteroatoms, and $R^9$ and $R^{10}$ are independently hydrogen or $R^7$ or $R^8$ together with $R^6$ form a spiro ring optionally containing heteroatoms such as oxygen, preferably $R^6$ contains from 1 to 20 carbon atoms. Examples of cycloaliphatic epoxies include, for example, 3,4-epoxycyclo-hexylmethyl-(3,4-epoxy)cyclohexane carboxylate, dicycloaliphatic diether diepoxy [2-(3,4-epoxy) cyclohexyl-5,5-spiro(3,4-epoxy)-cyclohexane-m-dioxane], bis (3,4-epoxy-cyclohexylmethyl)adipate, bis(3,4-epoxycyclohexyl)adipate and vinylcyclohexene dioxide [4-(1,2-epoxyethyl)-1,2-epoxycyclohexane]. Cycloaliphatic epoxies include compounds of the formulas:

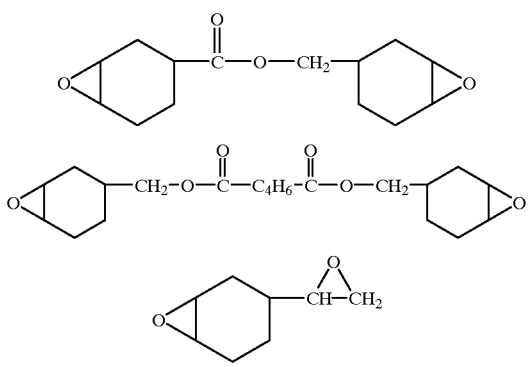

-continued

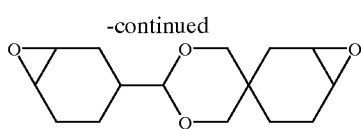

Commercial examples of preferred epoxy resins include, for example, EPONO Resins DPL-862, 828, 826, 825, 1001, 1002, EPONEX® Resin 1510, HELOXY® Modifiers 32, 62, 63, 64, 65, 67, 68, 71, 107, 116, EPON® Resin DPS155, EPON® Resin HPT 1050 and CARDURA® Resin E-10 all available from Shell Chemical Company and Union Carbide Epoxy Resins ERL-4221, 4289, -4299, -4234 and -4206.

The hydrophilic amidoamine is contacted with the hydrophobic epoxy resin under conditions effective to react the amine group and the epoxide group and to produce the epoxy-functional polyethers.

Epoxy Resin Component

The epoxy resin component can be any epoxy resin having a functionality of greater than 0.8 epoxide group per molecule, preferably at least 1.2 epoxide group per molecule, preferably at most to 6.5 epoxide group per molecule. These epoxy resins include those mentioned above for use in preparing the surfactant. Suitable epoxy resins include glycidyl ethers prepared by reacting epichlorohydrin with a compound containing, on the average, greater than one hydroxyl group carried out under alkaline reaction conditions. Examples of epoxy resins suitable for use in the invention include in addition to the epoxy resins mentioned above, polyglycidyl esters of polycarboxylic acids, and glycidylmethacrylate-containing acrylic resin. Polyglycidyl esters of polycarboxylic acids are mentioned below.

Aqueous Epoxy Resin Dispersions

In a typical aqueous dispersion of the invention useful for coating applications, the amount of the epoxy resin component (b) is from 20 to 75 percent by weight, preferably from 55 to 65 percent by weight, based on the total dispersion. Generally, a) water and b) an epoxy resin having a functionality of greater than 0.8 epoxide group per molecule are mixed under conditions effective to provide an oil-in-water emulsion in the presence of c) from 0.1, preferably from 0.5, more preferably from 1, to 20, most preferably to 6 weight percent, based on the epoxy resin of at least one epoxy-functional amidoamine surfactant mentioned above. One or more epoxy-functional amidoamine surfactants can be used. Optionally, a co-surfactant can be used along with the surfactant. Preferably, the dispersion also contains acetone. More preferably, the dispersion contains acetone and at least one non-volatile hydrophobic liquid resin or resin modifier. Acetone, is preferably present in an amount from 0, if present preferably from 0.5, more preferably in an amount of 1, up to preferably 5, more preferably up to 3% of the total aqueous dispersion. The non-volatile hydrophobic liquid resin or resin modifier is preferably present in an amount from 0, if present preferably in an amount from 1, to 10, preferably to 25%, based on the total amount of components b), c), and d) ii). It has been found that the invention provides a stable aqueous dispersion having an average particle size of preferably less than 2 g, more preferably less than 1µ.

The hydrophobic liquid resin or resin modifier can be any non-volatile, hydrophobic compound which is liquid, flowable at room temperature, whether neat or in a hydrophobic solution such as xylene or butanol. A substance is non-volatile when it meets the definition according to ASTM D 2369-93 or ASTM D 3960-93. For a coating composition, the hydrophobic liquid resin or resin modifier must be compatible (e.g. does not detract from corrosion resistances, or high gloss, etc.) with the curing agents in the coating composition, for example, such as amine curing agents. Preferable hydrophobic liquid resin or resin modifier include, for example, an aliphatic monoglycidylether, urea formaldehyde resin or an aliphatic monoglycidylester. Preferable hydrophobic liquid resin or resin modifier can be, for example, HELOXY® 7 Modifier (alkyl $C_8$–$C_{10}$ glycidyl ether), HELOXY® 9 Modifier ($C_{10-11}$ alkyl glycidylether) available from Shell Chemical Company and BEETLE® 216-10 Resin (alkylatecd urea formaldehyde high solids solution from Cytec Industries Inc).

These dispersions can be made by adding the surfactant and water to the epoxy resin to be dispersed or by producing the surfactant "in-situ" as described above. These dispersions can also be made by adding the epoxy resin to the amidoamine precursor and water. The surfactant can be produced in-situ by adding amidoamine precursor to the epoxy resin at an effective temperature to react the amidoamine and epoxy resin, or by adding the amidoamine precursor to a difunctional epoxy resin and dihydric phenol before or during the advancement reaction as described above.

The epoxy resin coating composition of the invention may include other additives, such as elastomers, stabilizers, extenders, plasticizers, pigments, pigment pastes, antioxidants, leveling or thickening agents, defoaming agents and/or cosolvents, wetting agents, cosurfactants, reactive diluents, fillers, catalysts, and the like. The aqueous dispersion can contain a monoepoxide diluent as reactive diluent.

Preferable monoepoxide diluents are those which contain a water-immiscible glycidated $C_{8-20}$ aliphatic alcohol, $C_{1-18}$ alkylphenol glycidylether, or glycidated versatic acid. The monoepoxide component can contain alicyclic and aromatic structures, as well as halogen, sulfur, phosphorus, and other such heteroatoms. Reactive diluents can be, for example, epoxidized unsaturated hydrocarbons such as decene and cyclohexene; glycidyl ethers of monohydric alcohols such as 2-ethylhexanol, dodecanol and eicosanol; glycidyl esters of monocarboxylic acids such as hexanoic acid; acetals of glycidaldehyde; and the like. The preferred reactive diluent. is glycidyl ether of monohydric $C_{8-14}$ aliphatic alcohols.

Useful coating compositions can be obtained by mixing an amine-functional epoxy resin curing agent with the aqueous epoxy resin dispersion mentioned above.

Curing Agent

The epoxy resin curing agent can be any curing agent effective to cure (or crosslink) the epoxy resin dispersed in the aqueous solution. These curing agents are generally water compatible (i.e., dilutable and/or dispersable). Suitable curing agents for use with the dispersions include those typically employed with epoxy resins, such as aliphatic, araliphatic and aromatic amines, polyamides, amidoamines and epoxy-amine adducts. They exhibit varying levels of compatibility with water, depending upon the nature of the starting materials employed for their preparation. In many cases, partial ionization with acetic acid, propionic acid and the like is required to effect or improve water compatibility or emulsifiability.

Preferably for curing at room temperature or lower temperatures an epoxide equivalent to amine hydrogen equivalent ratio of from 1:0.75 to 1:1.5 are generally employed. Suitable polyalkylene amines curing agents are those which are soluble or dispersible in water and which contain more than 2 active hydrogen atoms per molecule such as diethylenetriamine, triethylenetetramine, tetraethylenepentamine, etc. Other suitable curing agents include, for example, 2,2,4- and/or 2,4,4-trimethylhexamethylenediamine, 1,6-hexanediamine, 1-ethyl-1,3-propanediamine, 2,2(4),4-trimethyl-1,6-hexanediamine, bis(3-aminopropyl)piperazine, N-aminoethylpiperazine, N,N-bis(3-aminopropyl) ethylenediamine, 2,4(6)-toluenediamine and also cycloaliphatic amines such as 1,2-diaminocyclohexane, 1,4-diamino-3,6-diethylcyclohexane, 1,2-diamino-4-ethylcyclohexane, 1,4-diamino-3,6-diethylcyclo-hexane, 1-cyclohexyl-3,4-diaminocyclohexane, isophoronediamine, norboranediamine, 4,41-diaminodicyclohexylmethane, 4,41-diaminodicyclohexylmethane, 4,41-diaminodicyclohexylpropane, 2,2-bis(4-aminocyclohexyl)propane, 3,31-dimethyl-4,4'-diaminodicyclohexylmethane, 3-amino-1-cyclohexane-amino-propane, 1,3- and 1,4-bis(aminomethyl) cyclohexane. As araliphatic amines, in particular those amines are employed in which the amino groups are present on the aliphatic radical for example m- and p-xylylenediamine or their hydrogenation products. The amines may be used alone or as mixtures.

Suitable amine-epoxide adducts are, for example, reaction products of diamines such as, for example, ethylenediamine, diethylenetriamine, triethylenetetramine, m-xylylenediamine and/or bis (aminomethyl) cyclohexane with terminal epoxides such as, for example, polyglycidyl ethers of polyhydric phenols listed above.

Polyamidoamine curing agents can be obtained, for example by reacting polyamines with polycarboxylic acids such as dimerized fatty acids. In addition to the above polyamines, the water-soluble polyoxypropylenediamines with. molecular weights of 190 to 2,000 and also the readily water-dispersible curing agents, such as are described in the German Auslegeschrift 2,332,177 and the European Patent 0,000,605, for example, modified amine adducts are preferably employed. To cure the coating to completion, the coatings obtainable from these dispersions may also be heated for 30 to 120 minutes at an elevated temperature, preferably within the range of 50° C. to 120° C.

For higher temperature cure applications, aminoplast resins can be used as curing agents for epoxy resins having a high equivalent weight, e.g. greater than 700. Generally, from 5, preferably from 10, to 40, preferably to 30 weight percent of aminoplast resins, based on the combined weight of the epoxy resin and aminoplast: resin, is used. Suitable aminoplast resins are the reaction products of ureas and melamines with aldehydes further etherified in some cases with an alcohol. Examples of aminoplast resin components are urea, ethylene urea, thiourea, melamine, benzoguanamine and acetoguanamine. Examples of aldehydes include formaldehyde, acetaldehyde and propionaldehyde. The aminoplast resins can be used in the alkylol form but, preferably, are utilized in the ether form wherein the etherifying agent is a monohydric alcohol containing from 1 to 8 carbon atoms. Examples of suitable aminoplast resins are methylol urea, dimethoxy-methylol urea, butylated polymeric urea-formaldehyde resins, hexamethoxymethyl melamine, methylated polymeric melamine-formaldehyde resins and butylated polymeric melamine-formaldehyde resins.

Commercial examples of water-compatible curing agents include EPI-CURE® 8535, 8536, 8537, 8290 and 8292

Curing Agents (available from Shell Chemical Co.), ANQUAMINE 401, Casamid 360 and 362 curing agents (Air Products); EPILINK 381 and DP660 curing agents (Akzo Chemical Co.); Hardener HZ350, Hardeners 92-113 and 92-116 (Ciba Geigy); BECKOPOX EH659W, EH623W, VEH2133W curing agents (Hoechst Celanese) and EPOTUF 37-680 and 37-681 curing agents (Reichhold Chemical Co.).

The curable epoxy resin composition can be cured at a temperature within the range of from 5° C., preferably from 20° C., to 200° C., preferably to 175° C. for a time effective to cure the epoxy resin.

The aqueous dispersions of the instant invention and curing agents described above can serve as components of paints and coatings for application to substrates such as, for example, metal and cementitious structures. To prepare such paints and coatings, these resins are blended with primary, extender and anti-corrosive pigments, and a optionally, additives such as surfactants, antifoam agents, rheology modifiers and mar and slip reagents. The selection and amount- of these pigments and additives depends on the intended application of the paint and is generally recognized by those skilled in the art.

Examples of primary pigments include rutil(s titanium dioxide, such as KRONOS® 2160(Kronos, Inc.) and TI-Pure® R-960 from Du Pont, buff titanium dioxide, red iron oxide, yellow iron oxide and carbon black. Examples of extender pigments include calcium meta silicate, such as lOES WOLLASTOKUP®(NYCO Minerals, Inc.), barium sulfate, such as SPARMITE®(Harcros Pigments, Inc.) and aluminum silicate, such as ASP®170(Englehard Corp.). Examples of anticorrosive pigments include calcium strontium phosphosilicate, such as HALOX SWlll(Halox Pigments), zinc ion modified aluminum triphosphate, such as K-WHITE®84(Tayca Corp.) and basic aluminum zinc phosphate hydrate, such as HEUCOPHOS®ZPA(Heuco Tech, Ltd.).

Additional surfactants can be included in waterborne epoxy paints and coatings to improve both pigment and substrate wetting. Such surfactants are typically non-ionic, examples of which include TRITON® X-100 and TRITON X-405(Union Carbide), PLURONIC F-88 (BASF) and SURFYNOL® 104(Air Products and Chemicals).

Anti-foam agents and defoamers suppress foam generation during manufacture of the paint or coating. Useful defoamers include DREWPLUS®L-475(Drew Industrial Div.), DE FO®PF-4 Concentrate(Ultra Additives) and BYK0033 (BYK-Chemie).

Rheological additives are employed to obtain proper application properties. There are three types of additives that provide the desired thickening and shear thinning required for waterborne epoxy coatings; namely, hydroxyethylcellulose, organically modified hectorite clays and associative thickeners. NATROSOL®250 MBR and NATROSOL, Plus(Aqualon) are examples of modified hydroxyethyl-cellulosics and BENTONE®LT(RHEOX, Inc.) is representative of a hectorite clay. ACRYSOL®QR-708(Rohm and Haas Co.) is an often useful associative thickener.

Mar and slip agents improve early resistance to abrasion from scrubbing or light foot traffic. Polydimethylsiloxanes and polyethylene waxes are used in this regard. An example of a commercially available wax is MICHEM LUBE®182 (MICHELMAN, INC.).

The curable paint and coating compositions can be applied to a substrate by brush, spray, or rollers.

The aqueous dispersions of the instant invention can also be used as components of adhesives and fiber sizing.

Illustrative Embodiment

The following illustrative embodiments describe the process of the invention and are provided for illustrative purposes and are not meant as limiting the invention.

Examples A–N demonstrate the epoxy resin dispersions of the invention containing the epoxy-functional amidoamine surfactant. The formation of the aqueous dispersion of the invention is compared with using a carboxylated polyethyleneglycol/epoxy adduct as a surfactant in Comparative Examples A-C and compared with using JEFFAMINE- based surfactant in Comparatives D and E. Examples I with comparative examples demonstrate paint. formulations using the epoxy resin dispersion of the invention.

EPON® Resin 828 (a diglycidyl ether of dihydric phenol having epoxy equivalent weight of 187–188) and EPON® Resin 1001F (an epoxy resin formed by advancing a diglycidyl ether of dihydric phenol with bisphenol-A having epoxy equivalent weight of 525–550), EPON® Resin 1002 (an epoxy resin formed by advancing a diglycidyl ether of dihydric phenol with bisphenol-A having epoxy equivalent weight of 600–700), HELOXY® Modifier 64 (nonylphenol glycidylehter), HELOXY® Modifier 62 (ortho-cresol glycidyl ether), HELOXY® Modifier 7 (alkyl $C_8$–$C_{10}$ glycidyl ether), HELOXY® Modifier ($C_{10-11}$ alkyl glycidylether) or liquid epoxy diluent were obtained from Shell Chemical Company. DEN 438 (phenol novolac-glycidyl ether having EEW of 176–181) was obtained from Dow Chemical Company. Polyethylene glycol monomethyl ether and polyethylene glyol were obtained from Aldrich Chemical Co. 2-methyl-1,5-pentanediamine (Dytek A) was obtained from DuPont. m-Xylylenediamine was obtained from Mitsubishi Gas Chemical Co.

TESTING METHODS

I. Viscosity Viscosities were determined on the obtained emulsion or dispersion by means of a Brookfield Synchro Lectric Viscometer from Brookfield Engineering Laboratories.

II. Particle Size The determination of emulsion and dispersion particle sizes was accomplished with a Brookhaven Bi-DCP Particle Sizer from Brookhaven Instruments Corporation unless otherwise specified. Dn is number average particle size and Dw is mass average particle size. All particle size data is reported irn microns, $\mu$.

III. Percent Solids The percent solids of all products were measured by spreading a 0.5 gram sample of the product. onto aluminum foil, placing the coated foil into a forced draft oven, held at 120° C., for 10 minutes, determining the residual weight of the film by ratioing the residual weight to the total weight and multiplying by 100.

IV. Weight per Epoxide The weight per epoxide (WPE or EEW) of all products was determined by drying a weighed amount of sample by means of azeotropic distillation with methylene chloride then titrating the residue by known methods and correcting for percent solids to determine the WPE at 100% solids content.

V. Settling Settling was determined by observing the accelerated settling, with time, of a sample contained in a 4 ounce glass jar. A sample is centrifuged typically at 1,000 rpm.

Preparation of Surfactant Precursor

EXAMPLE 1.

Preparation of alpha-(2-carboxymethyl)-omega-methoxy-poly(oxy-1,2-ethanediyl)

To a 3000mL, four neck flask, fitted with a stirrer, thermocouple, air sparge tube, condenser and addition funnel, was added 495.6 grams (0.099 equiv.) of polyethylene glycol monomethyl ether of approximately 5000 Mn(Aldrich Chemical Co.),15.4 grams (0.099 equiv) of 2,2,6,6-tetramethyl-1-piperidinyloxy, free radical (Aldrich Chemical Co., TEMPO, free radical) and 1000 grams of dichloromethane. The mixture was heated to reflux, then air was introduced into the mixture through the sparge tube. Next, concentrated nitric acid (15.4 grams) was then added over 15 minutes and the mixture was held at reflux for 19 hours. Volatiles were then removed by means of a rotary evaporator. The residue solidified upon cooling. It was ground to a powder, washed with 2-propanol and dried in a vacuum oven at 40° C. to constant weight. NMR Analysis confirmed conversion of hydroxyl to carboxyl functionality. The solid possessed an acid equivalent weight of 5025.

EXAMPLE 2

Preparation of the Amidoamine from Example 1

750 grams of the carboxylic acid from Example 1 at 62% NV in $CCl_4$ was dissolved in 1500 grams of spectrometric grade isopropanol at 43° C. The product was allowed to precipitate at 23–25° C. overnight. The ppt. was collected on a filter and washed with 300 grams fresh RT isopropanol. The filter cake was placed in a vacuum desiccater at RT for several days and allowed to reach a constant weight of 378.4 grams. The acid equivalent weight of this dried product was approximated to be 4696.

To a 1 liter flask fitted with a stirrer, vacuum and a nitrogen sparge tube were added 370 g of the dried product and 91.3 g of Dytek A. The batch was heated to 192° C. and held at reflux for 3 hours and 11 minutes. The batch was then allowed to cool to 84° C. and the excess Dytek A was removed by vacuum distillation at around 5 mm Hg. The batch was then heated to 200° C. and sparged with nitrogen for 3 hours 15 minutes. At this point the active amine nitrogen equivalent weight was determined to be 5,642. This polyethyleneglycol amidoamine product, was used as is to make dispersions by in situ reaction with epoxy resins prior to water addition in Example A.

EXAMPLE 3

Preparation of an α-(Carboxymethyl)-ω-(Carboxymethoxy)-poly(oxy-1 2-ethanediyl).

To a 2000mL, four neck flask, fitted with a stirrer, thermocouple, air sparge tube, condenser and addition funnel, was added 500 grams (0.125 equiv.) of polyethylene glycol of approximately 8000 Mn (Aldrich Chemical Co.), 19.5 grams (0.125 equiv.) of 2,2,6,6-tetramethyl-1-piperidinyloxy, free radical (Aldrich Chemical Co., TEMPO, free radical) and 1000 grams of dichloromethane. The mixture was heated to ref lux, then air was introduced into the mixture through the sparge tube. Next, concentrated nitric acid (7.8 grams) was added over 15 minutes and the mixture was held at reflux for 17 hours. After this time, 550 grams of 2-propanol were added and the mixture stirred briefly. Volatiles were then removed by means of a rotary evaporator. The residue, 510.9 g, solidified upon cooling. The solid was washed with isopropanol, then ground to a powder and dried in a vacuum oven at 40° C. to a constant weight of 484 grams. NMR Analysis indicated complete conversion of hydroxyl to carboxyl functionality. The solid possessed an acid equivalent weight of 4168.

EXAMPLE 4

Preparation of the Amidoamine from Example 3

To a 1 liter 4-neck round bottom flask were added 300 grams of Example 3 (0.1439 equivalents acid). This flask was then equipped with a stirrer, temperature controller, distillation apparatus and a subsurface gas inlet sparge tube. To the acid was added 83.5 grams (2.874 equivalents of amine hydrogen) Dytek A amine (2-methyl-1,5-pentanediamine). The contents were allowed to react at 190° C. for 5 hours then the excess amine and water of amide condensation were removed using 4.88 cm vacuum. The residual unreacted amine and water were removed by sparging the batch at 200° C. with Nitrogen for 2 hours and 35 minutes. The amido aminated material was then poured onto an aluminum pan and allowed to solidify. The resulting material gave a titrateable nitrogen that indicated an amine hydrogen equivalent weight of 2032.5.

EXAMPLE 5

Preparation of an α-(Carboxymethyl)-ω-(Carboxymethoxy)-poly(oxy-1,2-ethanediyl)

In a similar procedure to that used in Example 1, the carboxylate of monomethoxypolyethylene glycol 2000 (Aldrich Chemical Co.) was converted to a carboxylate having an acid equivalent weight of 2,039.

EXAMPLE 6

Preparation of the Amidoamine from Example 5.

In a similar procedure to that used in Example 2 the Dytek A amido amine of the carboxylate of Example 5 was made with a titratable nitrogen equivalent weight of 2,371.

EXAMPLE 7

Preparation of an amidoamine using caroboxylate of poly (ethylene glycol) 4600

Poly(ethylene glycol) of 4,600 average molecular weight was oxidized to the corresponding acid using 4-Hydroxy-2, 2,6,6-teramethyl-1-piperidinyloxy free radical in a similar manner to that described in Example 1. The resulting material had a weight per equivalent acid of 2735. This material was then amidified with 10 equivalents of primary amine per equivalent acid using Dytek A amine. This amidoamine was isolated; 25% of the primary amine was capped, with Cadura® E-10 epoxy (glycidated neodecanoic acid from Shell Chemical Co.) and then diluted to approximately 65%NV with deionized water.

EXAMPLE 8

Preparation of Partially End Capped Amidoamine Poly (ethylene glycol), 4,600 average molecular weight was oxidized to the corresponding acid using 4-Hydroxy -2,2,6, 6-teramethyl-1-piperidinyloxy free radical in a similar manner to that described in Example 1. The resulting material had a weight per equivalent acid of 2735. This material was then amidified with 10 equivalents of primary amine per equivalent acid using Dytek A amine. This amido amine was isolated; 25% of the primary amine was capped with Carudra® E-10 epoxy and then diluted to approximately 65%NV with deionized water.

EXAMPLE 9

Preparation of an Amidoamine from Diethylenetriamine

Poly(ethylene glycol), 4600 average molecular weight was oxidized to the carboxylic acid form in a similar manner described in the Example 8 above. The acid functional starting material had an acid equivalent weight of 2847. This material was then amidified using 10 moles of diethylenetriamine [111-40-0]. The excess amine was removed by distillation and the resulting amidoamine had a measured weight per titratable nitrogen was 2416. This amidoamine, 65 grams, was dissolved in 35 grams deionized water. To this solution was added 2.0 grams of Cardura® E-10 monoepoxide. This mixture was allowed to mix for two days after which it was used to make an epoxy dispersion.

EXAMPLE 10
Preparation of an Amidoamine from Triethylenetetramine

The sodium oxalate of Poly(ethlene glycol) 4600 average molecular weight (PEG 4600) was made by dehydrating 230 grams PEG4600 blended with 4.8 grams of 50% aqueous NaOH in 100 grams of toluene. This sodium oxalate was then reacted with methyl chloroacetate in the presence of tetrabutyl ammonium bromide 0.23 grams at 100° C. for 3 hours. The toluene was distilled off under vacuum and then 73 grams triethylenetetramine [112-24-3] was added. These reactants were held at 190° C. for 6 hours and the excess amine was removed under vacuum at 230° C. The resulting amido amine had. a measured weight per titratable nitrogen of 2153. This amidoamine, 65 grams, was dissolved in 35 grams deionized, water. This aqueous solution was used to make an epoxy dispersion.

Comparative Example 1. Preparation of an Epoxy-Functional Surfactant

EPON® Resin 828 (80.9 grams, 0.433 eq.) from Shell Chemical Co., 75.38 grams (0.015 equivalent) of the carboxylic acid of Example 1, and 0.16 grams of ethyltriphenylphosphonium iodide (ETPPI) were reacted under nitrogen at 120C for 2.5 hours, then the mixture was isolated. The epoxy equivalent weight (EEW) of the product: was determined to be 378.

Preparation of Surfactant and Aqueous Dispersion

EXAMPLE A

To a 2 liter resin flask fitted with an agitator and automatic temperature control, were added in order, 90.91 g Arcosolv PE (propylene glycol monoethyl ether from Arco Chemical Co.), 50.47 g EPON® Resin 828, 563.75 g of flaked EPON® Resin 1001 and 15.03 g Cardura® E-10 epoxy diluent. This batch was heated slowly with to 120° C. over 45 minutes and the agitator was then started.The batch was then allowed to cool to 100° C. After all the EPON® Resin 1001 was dissolved, 40.0g of amidoamine from Example 2 and 26.7 g deionized water were added to the batch. The batch was then allowed to cool to 930° C. over 20 minutes. Then, 81.69 deionized water was added over 1 minute during which time the temperature was allowed to drop to 870° C. At this point the batch had inverted to form a resin in water emulsion. The batch was held for 12 hours at 65–34° C. Then the batch was diluted to 1,840 cP viscosity at 58.8% NV with deionized water over 1 hour and 40 minutes. The particle size of this dispersion was Dn average 0.741 and Dw average 1.271 microns.

EXAMPLE B
Epoxy resin dispersion made using isolated EPON® Resiu 828/Example 2 adducted surfactant.

Dytek A amidoamine adduct of carboxylated methoxy PEG 5000 from Example 2 was added to EPON® Resin 828 in the ratio of 5 equivalents of epoxy to 1 equivalent of active amine hydrogen.

This adduct in the excess epoxy, was used to makes an epoxy dispersion by adding 42.4 grams of the EPON® Resin 828/Dytek A amidoamine adduct, excess EPON® Resin 8213 mixture to 357.81 grams of a molten bisphenol A epoxy resin having an epoxy equivalent weight of 504. Then to this molten mixture at 1160° C. was added 32.4 grams of ethylene glycol monopropyl ether solvent. To this solution at 820° C. was added 55.1 grams deionized water over 10 minutes. At the end of this add the batch was 700° C. and had inverted to form a resin in water emulsion. This emulsion was allowed to mix for 54 minutes then an additional 45.8 grams water was added over 12 minutes. The batch was allowed to mix for 78 minutes and then 7.27 grams of HELOXY® 7 monoepoxide diluent was added with good mixing. After 15 minutes the batch was thinned over 25 minutes in order with 145.6 grams deionized water and 43.0 grams ethylene glycol monopropyl ether. The emulsion was allowed to cool to 42° C. during these additions. The batch was then characterized after mixing an additional 15 minutes. The particle size of the resulting emulsion was Dn 0.514$\mu$ and Dw 0.653$\mu$. The viscosity was 1,636 centipoise at 550.NV and the epoxy equivalent weight of the solids was 487.

EXAMPLE C
Epoxy resin dispersion made using adducted surfactant made "In-Situ."

Using amidoamine made by the process in Example 2 above, a dispersion was made by a similar process as described in Example B above. In a liter resin flask fitted with a Cowles type agitator 285.8grams of EPON® Resin 828, and 84.8 grams of Bisphenol A were advanced to approximately 500 EEW with ethyltriphenylphosphonium iodide catalyst. To this molten resin was added 32.8 grams Eastman®EP (ethylene glycol monopropyl ether from Eastman Chemical Co.). To this solution was added 29.4 grams of the amidoamine. After the amidoamine was allowed to react with the epoxy, 125.2 grams deionized water was added over 132 minutes while allowing the batch to cool to 68° C. with good mixing. At this point the resin formed an oil in water emulsion. To the batch was then added 13.0 grams EPON® Resin 828 and 7.27 grams HELOXY(9 Modifier 7 as diluent. The emulsion was mixed thoroughly for 36 minutes. The batch was then diluted with 128.4 grams deionized water and 42.6 grams Eastman EP while allowing the batch to cool to 480° C. over 42 minutes.

The resulting dispersion had a particle size Dn of 0.395$\mu$ and Dw 0.572$\mu$. The viscosity of this batch was 15,2603 centipoise when adjusted to 50.7w NV with additional water.

EXAMPLE D
Epoxy resin dispersion made using adducted surfactant made, "In-Situ."

Using amidoamine from Example 2 above, in a similar manner to Example C, using the same weights of each component, a dispersion was made except the amidoamine was added with the EPON® Resin 828 and Bisphenol A during the polymerization. After the target EEW was reached the batch was diluted with Eastman EP and the appropriate amount of water to form an emulsion. Then the same level Heloxy® Modifier 7 as diluent was added after which the batch was further diluted with Eastman EP and deionized water to reach the same composition as in Example C. This dispersion had a particle size Dn 0.405$\mu$ and Dw 0.623$\mu$. The dispersion viscosity was 12,320 centipoise when adjusted to 52.0% with additional water.

EXAMPLE E
Epoxy resin dispersion made using monoepoxide/Example 2 adducted surfactant.

To 150 grams of amidoamine, prepared according to the procedures described in Example 2, was added 18.1 grams of HELOXY® Modifier 64, nonyl phenol glycidyl ether. These materials were allowed to adduct at 120° C. for an hour.

By the same method as in example B above, aR dispersion was made using this surfactant at the same concentration polyethylene glycol surfactant as in example B. The resulting emulsion had a particle size Dn of 0.698$\mu$ and Dw 0.974$\mu$. The viscosity was 508 centipoise at 54.7% NV.

EXAMPLE F

Epoxy resin dispersion made using multifunctional epoxide/ Example A adducted surfactant.

Dispersed DEN®438 (a glycidated phenol novolac from Dow Chemical Co.), was made using surfactant from a. repeat of the surfactant described in Example B above. DEN 438 Resin, 503.08 grams and EPON® 1002 Resin, 18.52 grams were melted together in a 2 liter resin flask. To this batch was added 65.97 grams of the surfactant. The material was heated to 139° C. and then cooled to 125° C. at which point 126. grams of deionized water was added over 108 minutes while allowing the batch temperature to cool to 68° C. When the temperature reached 68 ° C. the batch inverted to form a resin in water emulsion. While the batch was being cooled to 25° C., it was diluted to 63.6%NV with additional deionized water while maintaining good mixing. The resulting particle size of this emulsion was Dn 0.523 and Dw 0.716 microns. The EEW was 195, based on nonvolatile resin, and the viscosity was 14,380 centipoise. The emulsion had excellent heat age stability compared to state of the art emulsions of similar novolac epoxies using surfactants described in US Pat. No. 4,122,067 claim 12, (Example No. 7). Compared to the dispersion of DEN438 in example 5 of U.S. Pat. No. 5,118,729, this dispersion Example F, contains less than half the level of surfactant and yet has a comparable particle size.

EXAMPLE G

Epoxy resin dispersion made using Example 4 surfactant added to an Epoxy Solution.

Using the apparatus described in Example A above the epoxy resin was made using 294.3 g EPON® resin 828, 85.85 g bisphenol A and 0.22g ethyl triphenyl phosphonium iodide catalyst. After polymerizing this epoxy to an epoxy equivalence of 463, the diamido amine surfactant from Example 4, 25.06 g, was added at 120° C. right after 57.24 g of glycol ether, Eastman EP was added to the batch. The batch was allowed to cool to 73° C. and then 185.4 g of deionized water was added over 3 hours and 20 minutes. The batch was then allowed to cool to 58° C. at which point it inverted to form a resin in water emulsion. The batch was then shut down overnight. The next morning the batch was heated to 76° C. with good mixing and 75.8 g additional DI water was added. Then 7.36 g HELOXY® 7 epoxy diluent was added. The batch was rather thin at this temperature and 19.08 g of Eastman EP was mixed in quickly. The batch was further diluted to obtain a 45% nonvolatile emulsion that was nonflowable at ambient: conditions. The particle size of this emulsion was measured to be 0.744$\mu$ Dn and 1.032$\mu$ Dw.

EXAMPLE H

Epoxy resin dispersion made using isolated EPON® Resin 828/Example 4 adducted surfactant.

To a 1 liter flask were added 200 g of the amindoamine from Example 4 and 91.8 g EPON® Resin 828. These materials were allowed to react while heating to 110° C. under a nitrogen atmosphere with good mixing. After this batch was held at 110° C. for 4.5 hours the epoxide equivalent weight was determined to be 720.

In a similar manner to Example B, an epoxy emulsion was formed from an advanced epoxy resin. This resin was composed of 281.8 g EPON® Resin 828, 85.85 g bisphenol A, 0.21 g of ETPPI, 37.5 g of surfactant above, 76.33 g Eastman EP glycol ether, 7.36 g HELOXY® 7 epoxy diluent and 336.1 deionized water. The resin in water emulsion formed at 67% NV and 72° C. At 50% nonvolatiles, this emulsion was too thick. to pour. The resulting particle size was Dn 0.319$\mu$ and Dw 0.985$\mu$.

EXAMPLE I

Epoxy resin dispersion made using isolated EPON® Resin 828/Example 6 adducted surfactant.

Using the same equipment and the same weights, an epoxy dispersion was made in similar fashion to Example A. In this dispersion the amido amine from Example 6 (the Dytek: A diamido amine of the carboxylated Methoxy PEG2000) was used at the same weight as in Example A. This dispersion inverted at 53° C. after 152 g of deionized water was added. The batch after inversion was allowed to mix for approximately 2 hours at 53–34° C. after which the particle size average was Dn 0.577 and Dw 0.742 microns. The batch was then diluted with additional deionized water to 12,500 cP viscosity at 57.9% NV.

EXAMPLE J

Epoxy resin dispersion usinq Example 8 adducted surfactant.

In a 4 liter resin flask a bisphenol A epoxy polymer was made and dispersed as follows: EPON® Resin 828 (liquid epoxy), 1095.34 g, was blended with 404.66 grams Bisphenol A and 0.53 g of ethyl triphenyl phosphonium iodide catalyst. This blend was polymerized to an epoxy equivalent weight of approximately 650. This epoxy polymer was blended with 210.58 g EPON® Resin 828, 28.95g Cardura E-10, and 52.50 g of Arcosolv PE glycol ether. This blend was allowed to cool to approximately 100° C. and then 26.25 g of Acetone was added. Then 121.74 g of Example 8 surfactant solution was added and allowed to react with the epoxy polymer at 100° C. for 1.5 hours. This epoxy polymer containing the surfactant was then allowed to disperse by adding 225 g of deionized water. The polymer emulsified with moderate mixing. After mixing for approximately one hour at 70–80° C. the polymer emulsion became homogeneous. The emulsion was then diluted with 875 g deionized water, 10 g Acetone and 5.66 g of Example 8 surfactant solution. The resulting epoxy dispersion had the following measured properties: 1) % NV 56.4, 2) Epoxy equivalent weight 516, 3) Brookfield viscosity 3,600 centipoise and a measured Dn particle size average 0.499 microns.

EXAMPLE K

Epoxy Dispersion using Example 9 (Deta Amidoamine) Adducted Surfactant

EPON® Resin 1001, 360.66 grams was dissolved in 55.77 grams of Arcosolv PE at 100° C. To this solution was added 35.7 grams of the aqueous solution from Example 9. After allowing the Example 9 solution to mix with the epoxy solution for 40 minutes at 101–93° C., the epoxy-surfactant. solution was dispersed by adding 47.34 grams of deionized water over 4 minutes, allowing the batch to cool to 65° C. then adding 45 grams of deionized water with good mixing over 1 hour and 35 minutes. At this point the batch was a resin in water dispersion. The batch was mixed an additional hour at. 63–66° C. and then 7.43 grams of Cardura(D E-10 epoxy was mixed into the dispersion. After mixing an additional hour the batch was thinned with an additional 165 grams deionized water. The resulting stable dispersion had an average particle size of 0.526 micron Dn and 0.746 Dw. The dispersion %NV was 54.0, the ambient viscosity was 16,720 centipoise and the resin epoxy equivalent weight was determined to be 564.

EXAMPLE L
Epoxy Dispersion using Teta amidoamine of Carboxylated PEG4600.

In the same manner as the Deta surfactant was used in Example I, Teta solution from Example 10, 36.05 grams, was used to disperse 360.66 grams of EPON® Resin 1001F in 55.7,grams Arcosolv PE. The resulting epoxy dispersion had an average particle size of 1.68 micron Dn and 2.08 micron Dw. The ambient viscosity was 18,200 centipoise at 48.1% NV. The resin epoxy equivalent weight was measured to be 585.

EXAMPLE M
Epoxy resin dispersion using Example 8 adducted surfactant.

To a 3-liter resin flask were added 532.76 grams EPON® Resin 828, 196.82 grams bisphenol A and 0.27 grams of ethyltriphenylphosphonium iodide. This catalyzed epoxy was then advanced to an epoxy equivalent weight of 675 at 170–191°° C. This batch was allowed to cool to 149° C. and the following additions were made in respective order; 80.53 grams of EPON® Resin 828, 24.55 grams of Arcosolv PM glycol ether and 89.12 grams of the surfactant solution described in Example 8 above. The batch solution was allowed to cool to 104° C. over 2 hours and then 110.19 grams of deionized water was added over 10 minutes with good mixing. Then the batch was mixed for an additional 30 minutes while the temperature dropped to 90° C. During this time the resin became emulsified in the aqueous continuous phase. After an additional 10 minutes of mixing the emulsion particle size was measured by a Coulter LS230 particle size analyzer. At this point the surface area mean particle size was 1.026 microns with 90% <2.502 and 99% <4.753 microns. To this emulsion was added 16.35 grams of Heloxy 9 liquid epoxy diluent and 27.76 grams of acetone over 10 minutes at 76–84° C. The particle size was measured again 25 minutes after this addition and it was surface area mean particle size 0.621 microns, 90% <1.332 and 99%<2.529. After the batch was mixed 55 minutes (from the addition of Heloxy 9/Acetone) at 76–81° C. the surface area mean particle size was 0.526 micron with 90%<0.923 and 99%<2.234. The batch was then thinned with additional 475 grams deionized water while allowing the temperature to drop to 85° C. The final properties of this batch measured at 25° C. after filtering through an 80 mesh polyester filter were 42,000 cp. viscosity, 57.4% NV and surface area mean particle size 0.411 microns, 90%<0.572 and 99% <0.865.

EXAMPLE N
Epoxy resin dispersion usinq Example 8 adducted surfactant.

The same composition as Example M was scaled up to 11 gallons using the same invention process. The particle size dropped. very quickly after the HELOXY® 9 liquid epoxy diluent and Acetone were added (N-1) at 17 hours after inversion reaching a particle size of 0.73 microns in 22 hours and (N-2) 1 hour after inversion reaching a particle size of 0.52 microns in 22 hours. The particle size were measured by a Coulter LS230 particle size analyzer.

Comparative Example A. Preparation of an Emulsion.

EPON® Resin 828, (262.6 g, 1.405 eq.) , bisphenol A(81.6 g, 0.716 eq.) and 0.2 g of ethyltriphenylphosphonium iodide were added to a 1 liter resin kettle. The kettle was flushed with nitrogen, then the contents were warmed to 101° C. and held until a solution formed. The contents were warmed slowly to 170° C. and maintained until the product EEW attained 510. The mixture was cooled to 75° C., during which time 51 grams of Eastman® EP were added. When the temperature reached 75*° C., 55.6 grams of the surfactant prepared in Comparative Example 1 were added. Next, the addition of 98.4 grams of deionized water was initiated and the mixture was allowed to cool until the mixture inverted from water in oil to an oil in water mixture. The inverted mixture was maintained at 60° C. for 1.5 hours then 7.27 grams of HELOXY@ 7 diluent was added. Next, 24.4 grams of Eastman EP and 147.6 grams deionized water were added. The emulsion was then isolated and characterized as follows: viscosity, 1700 cP; % solids, 56.7; EEW, 482 and number average particle size, 0.89 microns.

Comparative Example B Preparation of an Epoxy Emulsion by the In-Situ Method

EPON® Resin 828 (283.9 grams,1.52 equivalents) and 36.0 grams(0.0076 eq.) of an oxidized polyethylene glycol monomethyl ether of 5000 MW, prepared according to the procedure of Example 1, were added to a one liter resin kettle and warmed to 90° C. under vacuum for 43 minutes. After this time, 80.1 grams (0.703 e.g.) of bisphenol A and 0.27 grams of ethyltriphenylphosphonium iodide were added. The mixture was slowly warmed to a peak temperature of 183° C. whereupon the mixture exhibited a EEW of 497. While cooling to 75° C., 51 grams of Eastman EP were added; then, 98.4 grams of deionized water were slowly added and cooling was allowed. to continue. Despite cooling to 50° C., inversion failed to occur, so 13.8 grams more water was added, and the mixture was rewarmed to 690° C. Another 8 grams of water was added, whereupon inversion took place. After stirring for 50 minutes at 48–70° C. , another 8.0 grams of water were added, followed by 7.27 grams of HELOXY® 7 diluent, 24.4 grams of Eastman EP and 118.1 grams of water.

The following properties of the final product were determined to be: viscosity, 67,600 cP; % solids, 57; EEW, 480 and number average particle size, 0.80 microns.

Comparative Example C

As comparison, a blend of the product of Example 1 and EPON® Resin 828, 4/96 (w/w), failed to produce an emulsion when treated as follows. Upon cessation of stirring the water and organic phases separated. A blend containing the product of Example 1 was heated briefly to 60° C. to effect miscibility, then cooled to ambient temperature. Using a. Dispermat Stirrer (fromByk Gardner, Inc.), stirred at 2000 rpm while water was slowly added until inversion took place. Subsequently, additional water was rapidly added to render the composition 60% in solids. Upon cessation of stirring the water and organic phases separated.

Comparative Example D

Epoxy Dispersion with 6% JEFFAMINE® ED2001 based on total NV

To a 1 liter resin flask fitted with an agitator, Nitrogen inlet, vacuum and a ref lux condenser were added 294.25 grams EPON® Resin 828 (1.565 equivalents), 81.75 grams bisphenol A (0.717 equivalents) and ethyl triphenylphosphonium iodide catalyst. The batch was then polymerized to an epoxy equivalent weight of 445 and then allowed to cool from 168° C. to 126° C. Then 24.0 grams of JEFFAMINE® ED-2001 (ex.Texaco Chemical Co.) was added and the batch was held at 119–132° C. for one hour. Then 50.98 grams of ethylene glycol monoproyl ether was added and the batch was allowed to cool to 68° C. with good mixing. Deionized water, 112.4 grams was added to the batch over 1 hour and 20 minutes. The batch temperature was 51° C. The batch had to be cooled to 31° C. to initiate the inversion of the batch to a resin in water dispersion. While allowing the batch to warra to 55° C, 7.27 grams of Heloxy 7 epoxy diluent was added and mixed for two hours. Then a solution of 134.2 grams DI water and 24.4 grams ethylene glycol monopropyl ether were added to dilute the dispersion to 120cp viscosity. The %NV was measured to be 56.6% and the particle size was Dn average 0.984$\mu$ with 1.484$\mu$ Dw average. Soft settling of this dispersion was noted after setting at RT for one month.

Comparative Example E Epoxy Dispersion with Surfactant JEFFAMINE® M2070-Epoxy adduct.

The JEFFAMINE® M2070-EPONO Resin 828 adduct surfactant was made by allowing 0.145 equivalents of the JEFFAMINE® M2070 (ex. Texaco Chemical Co.) to react with 1.452 equivalents of EPON® Resin 828 at 110° C. for 3 hours. In a very similar method to that described in Example B and H, 253.7 grams EPON® Resin 828, 78.9 grams bisphenol A and 0.20 grams ETPPI catalyst were polymerized and 67.4 grams of the JEFFAMINE® M2070-EPONO Resin 828 surfactant was added prior to dilution with ethylene glycol monopropyl ether, 51.6 grams. To form an inverted resin in water dispersion at 75° C., 228.3 grams of deionized water was required. The Heloxy 7 epoxy diluent, 7.27 grams was added. And the batch was mixed for an additional 2 hours but the particle size average was greater than 5 microns.

TABLE 1

Properties of the Epoxy Resin Dispersions

| Dispersions | Viscosity(cp) | % NV | Dn ($\mu$) | Dw ($\mu$) |
| --- | --- | --- | --- | --- |
| Example A | 1,8400 | 58.8 | 0.741 | 1.271 |
| Example B | 1,636 | 55.0 | 0.514 | 0.653 |
| Example C | 15,620 | 50.7 | 0.395 | 0.572 |
| Example D | 12,320 | 52.0 | 0.405 | 0.623 |
| Example E | 508 | 54.7 | 0.698 | 0.974 |
| Example G | >100,000 | <45.0 | 0.744 | 1.032 |
| Example H | >100,000 | 50.0 | 0.319 | 0.985 |
| Example I | 12,500 | 57.9 | 0.577 | 0.742 |
| Example J | 3,600 | 56.4 | 0.499 | 0.685 |
| Example K | 16,720 | 54.0 | 0.526 | 0.746 |
| Example L | 18,200 | 48.1 | 1.68 | 2.08 |
| Example M | 42,000 | 57.4 | 0.357 | 0.44 |
| Example N-2 | 15,320 | 53.8 | 0.523 | 0.684 |
| Comparative Example A | 1,700 | 56.7 | 0.89 | 1.64 |
| Comparative Example B | 67,600 | 57 | 0.802 | 1.08 |
| Comparative Example C | — | — | >5 | — |
| Comparative Example D | 120 | 56.6 | 0.984 | 1.484 |

Preparation of Paint Example I and Comparative Examples. Two Component Paint Formulations.

The EPI-REZO Resin 3520/EPI-CUREO Curing Agent 8536 paint was made as outlined in Shell Chemical Company Resins Starting Formulation No. 1805, standard publication SC:1893-94 wherein the titanium dioxide is dispersed in the curing agent. The EPI-REZ® Resin 5522/EPI-CUREO Curing Agent 8290 paint was made as outlined in Shell Chemical Company Resins Starting Formulation No. 1804, standard publication SC:1892-94 wherein the pigment is dispersed in the curing agent. The paints using epoxy resin dispersions from Example B where made by the same respective general guidelines except in the No. 1804 type formulation Arcosolv PnP glycol ether (1-ethyoxy-2-propanol from Arco Chemical Co.) was used to replace Cyclo Sol 63 and no additional Eastman EP was added. Also no lube was added to any of the paints but 0.50% FC431 (from 3M) was added to all the paints as a flow modifier.

When epoxy dispersion and Example B is formulated. in a 1:1 Pigment to Binder (R-960 from DuPont) ratio, titanium dioxide paint it performs comparable or better than EPI-REZ® Resin 3520 based dispersion for methyl ethyl ketone resistance and better than EPI-REZ® Resin 5522 based. dispersion for higher percent gloss. The paint properties are listed in Table 2.

This white enamel paint performance as shown for Example N-2 epoxy dispersion with the curing agent E, described below, was obtained by dispersing the titanium dioxide into the curing agent to which acetic acid, pigment wetter and defoamer were added. The acetic acid was used at a level that was 0.12 equivalents acetic acid per total equivalents of titrateable nitrogen of the curing agent. The pigment to binder ratio in this paint was 0.7:1.0; the VOC was 1.2 pounds per gallon (composed of acetone and dipropylene glycol normal butyl ether in a weight ratio of 1:1 and the existing VOC introduced into the paint by the Example N-2 epoxy dispersion); and the combining ratio of equivalents of epoxy to amine hydrogen was 1.1 to 1.0.

Curing Agent E is a curing agent dispersion described as follows:

Detailed Procedure:

A 4 necked round-bottomed glass flask was equipped with a, condenser having a water trap, a nitrogen inlet, a resin solution inlet and the amine inlet. The flask was flushest with nitrogen.

The amine (triethylenetetramine) (468.72g) was charged into the reactor and heated to 93 deg C. At 93 deg C. a metered addition of the resin solution EPON® Resin 1001-X-75 (670g)to the amine was started at such a rate that the temperature of the reaction mixture did not exceed 121 deg C. After completion of the addition, the mixture is kept at 93 deg C. for additional 60 minutes. Excess amine and xylene were distilled off at about 140° C. under about 1.5 mmHg. The reaction product had an amine value of about 300 mg KOH/g. Subsequently the reaction mixture was cooled to 121° C. and 80.63g of acid terminated polyalkyleneglycol surfactant (in solid form), representing a final surf actant level of about: 3.2% on solids resin weight, were charged into the flask and heated to about 200° C. for 2 hours. The acid value of the reaction mixture was measured after 2 hours of reaction and a value of 2 mg KOH/g was found indicating that the reaction was completed.

Subsequently the reaction mixture was cooled to 93° C., after which 176.5 g of HELOXY® 62 Modifier, representing about 1 equivalent of epoxy per primary amine on the amine adduct, were added to the reaction vessel at a rate such that the maximum temperature did not exceed 121° C. After completion of the addition, the reaction was held at 93° C. for 60 minutes The reaction mixture was allowed to cool to about 78° C. Water was dropwise added until the reaction mixture was inverted from a water in oil to an oil in water emulsion. Further water was added to a total amount of 882.37g to obtain a final solids content of 45% by weight. The average particle size was 0.5$\mu$.

Also shown in Table 2, the paint performance using Example N-2 with a curing agent dispersion which illustrates the excellent development of the paint protective performance properties of this invention.

TABLE 2

Paint Performance of Dispersions Using PEG/Dytek A Amido Amine-Based Epoxy Resin Dispersions

| Epoxy | Curing Agent | Set to Touch | Cure at RT | 60° Gloss | Pencil Hardness | MEK D. Rubs |
|---|---|---|---|---|---|---|
| A[a] | C[a] | 1 hour | 7 days | 100 | F | 24 |
| Example B | C | 1 hour | 7 days | 100 | F | 30 |
| B[a] | D[a] | 1 hour | 7 days | 88 | H | 71 |
| Example B | D | 0.5 hour | 7 days | 96 | F | 54 |
| Example N-2 | E | 0.5 hour | 5 days | 95 | F | 60 |

[a]A is EPI-REZ ® Resin 3520 (an aqueous epoxy resin dispersion of diglycidylether of bisphenol-A having EEW of 535) available from Shell Chemical Company.
B is EPI-REZ ® Resin 5522 (an aqueous modified epoxy resin dispersion of diglycidylether of bisphenol-A having EEW of 625) available from Shell Chemical Company.
C is EPI-CURE ® Curing Agent 8536 (an aliphatic amidoamine curing agent having an amine hydrogen equivalent weight of 324) available from Shell Chemical Company.
D is EPI-CURE ® Curing Agent 8290 (an amine adducted novolac curing agent having an amine hydrogen equivalent weight of 163) available from Shell Chemical Company.

Preparation of Fiber Size

EXAMPLE II

Fiber Size Formulation.

To a 1 liter resin flask fitted with a variable rpm Cowles type disperser, were added 248.6 grams of EPON® Resin 828, 94.4 grams of Bisphenol A and 0.21 ethyl triphenyl phosphonium iodide. This resin was advanced to an epoxy equivalent weight of 693 at 170° C. This batch was then cooled to 106° C. and 45.0 grams of the epoxy functional isolated. surfactant as described in Example B (the adduct of one mole Dytek A/carboxylated monomethoxy polyethylene glycol 5000 with 5 moles of EPONO Resin 828). This batch was allowed to cool to 860° C. and 97 grams of deionized water were added over 53 minutes while the batch cooled to 77° C. With the disperser set at 200 rpm, the batch formed a resin in water emulsion just prior to reaching 80% nonvolatile. The batch was allowed to mix for 75 minutes, then it was diluted over 10 minutes to 75% nonvolatile with deionized water while the batch was mixed at 400 rpm at 77° C. To the batch was then added 12.0 grams of Cymel® 300 melamine from Cytec Industries. This material was added over 13 minutes while the batch was continually mixed at 400 rpm and held at 77–78° C. This batch was then thinned with 137.2 grams deionized water while allowing the batch to cool to 52° C. with 400 rpm mixing.

The resulting dispersion had a particle size of Dn 0.964μ and Dw 1.317μ. The resulting nonvolatile content was 59.0% and the Brookfield, 6 at 50 rpm viscosity was 9,320 cP. This dispersion had good shelf stability. After 7 months the viscosity was 10,220 cP, the measurable epoxy equivalent weight was 693 and the nonvolatile had increased by only 0.5%. After 10 weeks at 120° F. the viscosity was 4,800 cP, the measurable epoxy equivalent weight was 883 and the nonvolatile content had increased by 1.4%.

This example illustrates the utility of this invention in providing waterborne epoxy resins for heat curable fiber sizing or adhesive formulations which are typically crosslinked by heating them to 200° F. to 400° F. in the presence or 0.1 to 3.0% imidazoles or dicyandiamide catalyst and crosslinkers.

We claim:

1. An aqueous epoxy resin dispersion comprising:
   a) water;
   b) at least one epoxy resin having a functionality of greater than 0.8 epoxide group per molecule;
   c) from 0.1 to 20 weight percent, based on the epoxy resin of at least one epoxy-functional surfactant prepared by reacting an amidoamine having the structures:

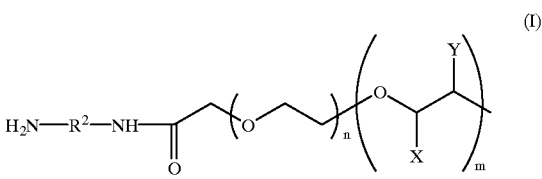

(I)

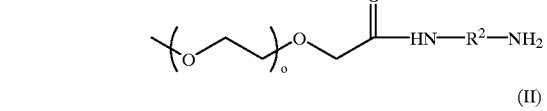

(II)

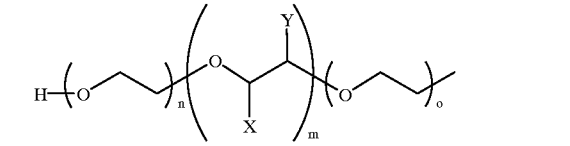

(III)

wherein R[1] is an alkyl, aryl, or arylalkyl group or mixtures thereof having 1 to 15 carbon atoms, R[2] is aliphatic, cycloaliphatic, or aromatic group having 2 to 18 carbon atoms optionally containing non-reactive oxygen or at most an average of 4 secondary and/or tertiary nitrogen atoms per structure in the backbone, wherein X and Y are independently hydrogen, methyl, or ethyl with the provision that X or Y is hydrogen, and n+m+o is a real number from 40 to 400, and n+o is a real number of at least 15, and for formula (III) o is a real number from 20 to 380, and wherein the ratio of (I) to (II) by weight is in the range of 100:0 to 0:100, the ratio of (I) to (Ill) by weight in the range of 100:0 to 0:100, and the ratio of (11) to (III) by weight in the range of 100:0 to 0:100, and at least one epoxy resin having a functionality of from greater than 0.8 epoxide group per molecule in an amine to epoxy equivalent ratio of at least 1:2.

2. The aqueous dispersion of claim 1 wherein m is a real number from 0 to 70 and n and o are independently a real number from 5 to 395 in formula (I), m is a real number from 0 to 70 n is a real number from 0 to 395 and o is a real number from 0 to 400 in formula (II), or m is a real number from 0 to 70 n is a real number from 0 to 395, and o is a real number from 0 to 400 in formula (III).

3. The aqueous dispersion of claim 1 wherein the at least one epoxy-functional surfactant is prepared by reacting amidoamine of structures (I) and (II) wherein the ratio of (I) to (II) by weight is in the range of 99:1 to 1:99 and the at least one epoxy resin.

4. The aqueous dispersion of claim 3 wherein the ratio of (I) to (II) by weight is in the range of 20:80 to 80:20.

5. The aqueous dispersion of claim 1 wherein the at least one epoxy-functional surfactant is prepared by reacting amidoamine of structures (I) and (III) wherein the ratio of (I) to (III) by weight is in the range of 99:1 to 1:99 and the at least one epoxy resin.

6. The aqueous dispersion of claim 5 wherein the ratio of (I) to (III) by weight is in the range of 20:80 to 80:20.

7. The aqueous dispersion of claim 1 wherein the at least one epoxy-functional surfactant is prepared by reacting amidoamine of structures (II) and (III) wherein the ratio of (II) to (III) by weight is in the range of 99:1 to 1:99, and the at least one epoxy resin.

8. The aqueous dispersion of claim 7 wherein the ratio of (II) to (III) by weight is in the range of 20:80 to 80:20.

9. The aqueous dispersion of claim 1 wherein the at least one epoxy-functional surfactant is prepared by reacting amidoamine of structures (I), (II) and (III) in an amount of 4 to 98 percent by weight of (I), 1 to 95 percent by weight of (II), 1 to 95 and percent by weight of (III) and the at least one epoxy resin.

10. The aqueous dispersion of claim 1 wherein the at least one epoxy-functional surfactant is prepared by reacting the amidoamine of structure (I) and the at least one epoxy resin.

11. The aqueous dispersion of claim 10 wherein m is 0.

12. The aqueous dispersion of claim 1 wherein the at least one epoxy-functional surfactant is prepared by reacting the amidoamine of structure (II) and the at least one epoxy resin.

13. The aqueous dispersion of claim 12 wherein m is 0.

14. The aqueous dispersion of claim 1 wherein the at least one epoxy-functional surfactant is prepared by reacting the amidoamine of structure (III) and the at least one epoxy resin.

15. The aqueous dispersion of claim 14 wherein m is 0.

16. The aqueous dispersion of claim 15 wherein the amidoamine is prepared by reacting an acid-terminated polyalkyleneglycol-containing compound having the formula

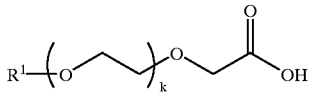

wherein $R^1$ is an alkyl, aryl, or arylalkyl group having 1 to 15 carbon atoms, k is a positive real number from 40 to 400, and at least one diamine in an amine to acid equivalent ratio of 6:1 to 25:1.

17. The aqueous dispersion of claim 2 wherein the diamine has the formula:

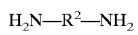

wherein $R^2$ is aliphatic, cycloaliphatic, or aromatic group having 2 to 18 carbon atoms optionally containing non-reactive oxygen or at most an average of 4 secondary and/or tertiary nitrogen atoms per molecule in the backbone.

18. The aqueous dispersion of claim 17 wherein the diamine is selected from the group consisting of m-xylylenediamine, 1,3-bisaminomethylcyclohexane, 2-methyl-1,5-pentanediamine, 1-ethyl-1,3-propanediamine, ethylenediamine, diethylene-triamine, triethylenetetramine, polyoxypropylenediamines, 2,2(4),4-trimethyl-1,6-hexanediamine, isophorone diamine, 2,4(6)-toluenediamine, 1,6-hexanediamine, and 1,2-diaminocyclohexane.

19. The aqueous dispersion of claim 17 wherein the epoxy resin is a phenolic-based epoxy resin having an average of 2 epoxy groups per molecule.

20. The aqueous dispersion of claim 14 wherein $R^1$ is a methyl group.

21. The aqueous dispersion of claim 10 wherein the amidoamine is prepared by reacting an acid-terminated polyalkyleneglycol having the formula:

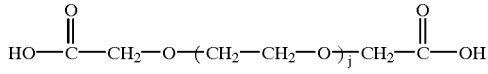

wherein j is a positive real number from 40 to 400, and at least one diamine in an amine to acid equivalent ratio of 6:1 to 25:1.

22. The aqueous dispersion of claim 1 wherein the amount of the epoxy resin component (b) is from 20 to 75 percent by weight, based on the total dispersion.

23. The aqueous dispersion of claim 2 wherein the residue of the epoxy resin reacted with the amidoamine in epoxy-functional surfactant component c) is the same as the epoxy resin component b) as determined by IR spectroscopy.

24. The aqueous dispersion of claim 1 further comprising a monoepoxide diluent.

25. The aqueous dispersion of claim 24 wherein the diluent comprises a water-immiscible glycidated $C_{8-20}$ aliphatic alcohol, $C_{1-18}$ alkylphenol glycidylether, glycidated versatic acid, or glycidoxyalkylalkoxysilane.

26. A curable epoxy resin composition comprising the aqueous dispersion of claim 2 and a water-compatible curing agent for the epoxy resin.

27. A cured composition of claim 26.

28. A curable epoxy resin composition comprising the aqueous dispersion of claim 5 and a water-compatible curing agent for the epoxy resin.

29. A cured composition of claim 28.

30. A curable epoxy resin composition comprising the aqueous dispersion of claim 7 and a water-compatible curing agent for the epoxy resin.

31. A cured composition of claim 30.

32. The aqueous dispersion of claim 1 wherein the epoxy resin in (c) comprises a mixture of an epoxy resin having a functionality in the range of 0.8 to 1.3 and an epoxy resin having a functionality of at least 1.7.

33. The aqueous dispersion of claim 1 further comprising d) a solvent comprising i) acetone.

34. The aqueous dispersion of claim 33 wherein acetone is present in an amount of 0.5 to up to 5% of the total aqueous dispersion.

35. The aqueous dispersion of claim 33 wherein the solvent further comprises ii) a non-volatile hydrophobic liquid resin or resin modifier.

36. The aqueous dispersion of claim 35 wherein the non-volatile hydrophobic liquid resin or resin modifier is present in an amount of 1 to 10% based on the total amounts of components b), c) and d)ii).

37. The aqueous dispersion of claim 36 wherein the non-volatile hydrophobic liquid resin or resin modifier is an aliphatic monoglycidylether, urea formaldehyde resin, or an aliphatic monoglycidylester.

38. The aqueous dispersion of claim 4 further comprising d) a solvent comprising i) acetone.

39. The aqueous dispersion of claim 38 wherein acetone is present in an amount of 0.5 to up to 5% of the total aqueous dispersion.

40. The aqueous dispersion of claim 38 wherein the solvent further comprises ii) a non-volatile hydrophobic liquid resin or resin modifier.

41. The aqueous dispersion of claim 40 wherein the non-volatile hydrophobic liquid resin or resin modifier is present in an amount of 1 to 10% based on the total amounts of components b), c) and d)ii).

42. The aqueous dispersion of claim 41 wherein the non-volatile hydrophobic liquid resin or resin modifier is an aliphatic monoglycidylether, urea formaldehyde resin, or an aliphatic monoglycidylester.

43. A curable epoxy resin composition comprising the aqueous dispersion of claim 33 and a water-compatible curing agent for the epoxy resin.

44. A cured composition of claim 43.

45. A curable epoxy resin composition comprising the aqueous dispersion of claim 35 and a water-compatible curing agent for the epoxy resin.

46. A cured composition of claim 43.

47. A curable epoxy resin composition comprising the aqueous dispersion of claim 38 and a water-compatible curing agent for the epoxy resin.

48. A cured composition of claim 47.

49. A curable epoxy resin composition comprising the aqueous dispersion of claim 40 and a water-compatible curing agent for the epoxy resin.

50. A cured composition of claim 49.

51. A coating composition comprising the aqueous dispersion of claim 33.

52. A coating composition comprising the aqueous dispersion of claim 35.

53. The aqueous dispersion of claim 3 wherein m is a real number from 0 to 70 and n and o are independently a real number from 5 to 395 in formula (I), m is a real number from 0 to 70, n is a real number from 0 to 395, and o is a real number from 0 to 400 in formula (II).

54. The aqueous dispersion of claim 3 wherein m is 0.

55. The aqueous dispersion of claim 53 further comprising d) a solvent comprising i) acetone.

56. The aqueous dispersion of claim 3 wherein the epoxy resin comprises a diglycidyl ether of dihydric phenol.

57. A curable epoxy resin composition comprising the aqueous dispersion of claim 3 and a water-compabble curing agent for the epoxy resin.

58. A cured composition of claim 57.

59. An aqueous epoxy resin dispersion comprising:

a) water;
b) at least one epoxy resin having a functionality of greater than 0.8 epoxide group per molecule;
c) a reaction product of the epoxy resin from component b) and from 0.1 to 15 weight percent, based on the epoxy resin, of at least one amidoamine having the formula:

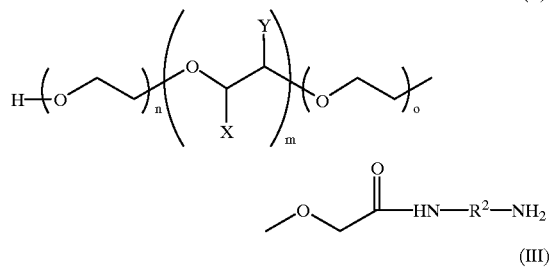

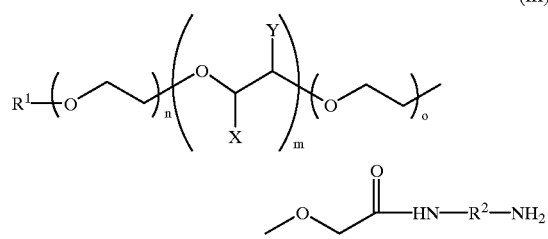

wherein $R^1$ is an alkyl, aryl, or arylalkyl group or mixtures thereof having 1 to 15 carbon atoms, $R^2$ is aliphatic, cydoaliphatic, or aromatic group having 2 to 18 carbon atoms optionally containing non-reactive oxygen or at most an average of 4 secondary and/or tertiary nitrogen atoms per structure in the backbone, wherein X and Y are independently hydrogen, methyl. or ethyl with the provision that X or Y is hydrogen, and n+m+o is a real number from 40 to 400, and n+o is a real number of at least 15, and for formula (III) o is a real number from 20 to 380, and the ratio of (I) to (II) by weight is within the range of 100:0 to 0:100, the ratio of (I) to (Ill) by weight within the range of 100:0 to 0:100, and the ratio of (II) to (III) by weight within the range of 100:0 to 0:100, and at least one epoxy resin having a functionality of from greater than 0.8 epoxide group per molecule in an amine to epoxy equivalent ratio of at least 1:2.

60. A process for the preparation of an aqueous epoxy resin dispersion comprising mixing under conditions effective to provide an oil-in-water emulsion a) water and b) an epoxy resin having a functionality of greater than 1.0 epoxide group per molecule in the presence of c) from 1 to 20 weight percent, based on the epoxy resin of at least one epoxy-functional surfactant prepared by reacting an amidoamine having the structure:

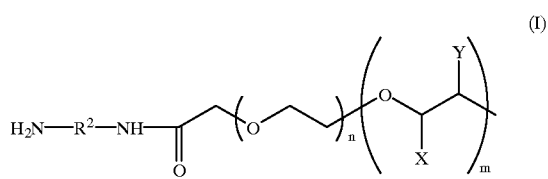

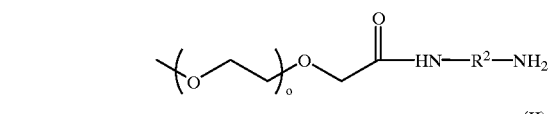

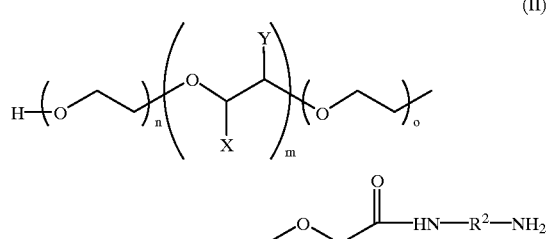

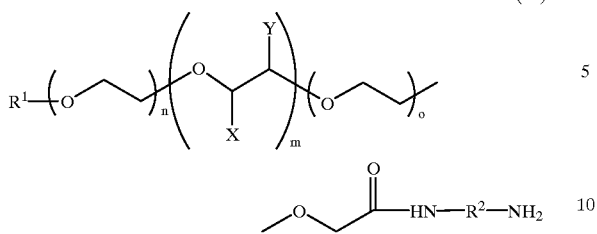

(III)

wherein R¹ is an alkyl, aryl, or arylalkyl group or mixtures thereof having 1 to 15 carbon atoms, R² is aliphatic, cydoaliphatic, or aromatic group having 2 to 18 carbon atoms optionally containing non-reactive oxygen or at most an average of 4 secondary and/or tertiary nitrogen atoms per structure in the backbone, pX and Y are independently a hydrogen, methyl or ethyl group with the provision that if X is methyl or ethyl, Y is hydrogen or if Y is methyl or ethyl, X is hydrogen] wherein X and Y are independently hydrogen, methyl, or ethyl with the provision that X or Y is hydrogen, and n+m+o is a real number from 40 to 400, and n+o is a real number of at least 15. and for formula (III) o is a real number from 20 to 380, and the ratio of (I) to (II) by weight is within the range of 100:0 to 0:100, the ratio of (I) to (Ill) by weight within the range of 100:0 to 0:100, and the ratio of (II) to (Ill) by weight within the range of 100:0 to 0:100, and at least one epoxy resin having a functionality of from greater than 0.8 epoxide group per molecule in an amine to epoxy equivalent ratio of at least 1:2.

61. The process of claim 60 wherein m is a real number from 0 to 70 and n and o are independently a real number from 5 to 395 in formula (I), m is a real number from 0 to 70, n is a real number from 0 to 395, and o is a real number from 0 to 400 in formula (II).

62. The process of claim 61 wherein m is 0.

63. The process of claim 61 further comprising d) a solvent comprising i) acetone.

64. An epoxy-functional composition prepared by reacting an amidoamine having the structures:

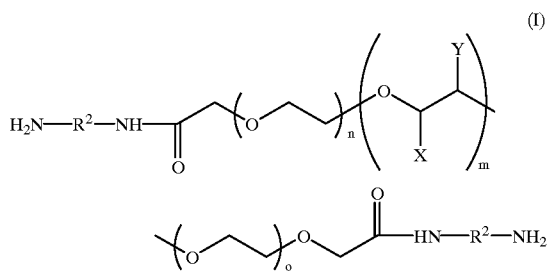

(I)

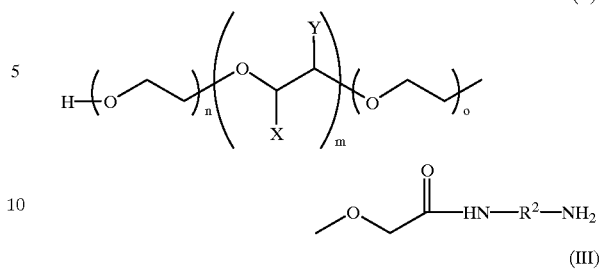

(II)

(III)

wherein R¹ is an alkyl, aryl, or arylalkyl group or mixtures thereof having 1 to 15 carbon atoms, R² is aliphatic, cycloaliphatic, or aromatic group having 2 to 18 carbon atoms optionally containing non-reactive oxygen or at most an average of 4 secondary and/or tertiary nitrogen atoms per structure in the backbone, X and Y are independently a hydrogen, methyl or ethyl group with the provision that if X is methyl or ethyl, Y is hydrogen or if Y is methyl or ethyl, X is hydrogen, and n+m+o is a real number from 40 to 400, and n+o is a real number in an amount effective to provide resin emulsification and wherein amidoamine of structures (I), (II) and (III) is present in an amount of 4 to 98 percent by weight of (I), 1 to 95 percent by weight of (II), 1 to 95 and percent by weight of (III) and at least one epoxy resin having a functionality of from greater than 0.8 epoxide group per molecule in an amine to epoxy equivalent ratio of at least 1:2.

65. The epoxy-functional composition of claim 64 wherein the epoxy resin is a mixture of an epoxy resin having a functionality in the range of 0.8 to 1.3 and an epoxy resin having a functionality of at least 1.7.

66. The epoxy-functional composition of claim 65 wherein the amidoamine is first contacted with the epoxy resin having a functionality in the range of 0.8 to 1.3, then subsequently contacted with an epoxy resin having a functionality of at least 1.7.

* * * * *